No. 888,293. PATENTED MAY 19, 1908.
H. ALL.
FRUIT CUTTER.
APPLICATION FILED NOV. 26, 1907.

WITNESSES
Samuel E. Wade
Amos W. Hart

INVENTOR
HENRY ALL
BY Munn & Co.
ATTORNEYS

UNITED STATES PATENT OFFICE.

HENRY ALL, OF CUTTER R. R. STATION, CALIFORNIA.

FRUIT-CUTTER.

No. 888,293.  Specification of Letters Patent.  Patented May 19, 1908.

Application filed November 26, 1907. Serial No. 403,900.

*To all whom it may concern:*

Be it known that I, HENRY ALL, a citizen of the United States, and a resident at Cutter R. R. Station, in the county of Tulare and State of California, have invented an Improved Fruit-Cutter, of which the following is a specification.

My invention is an improvement in the class of cutters employed for gathering grapes or other fruit, and comprises a cutting blade and a handle secured thereto in such manner that it may be held in the same hand used to seize a bunch of grapes or other fruit, the use of both hands for gathering the fruit being therefore unnecessary.

Figure 1:
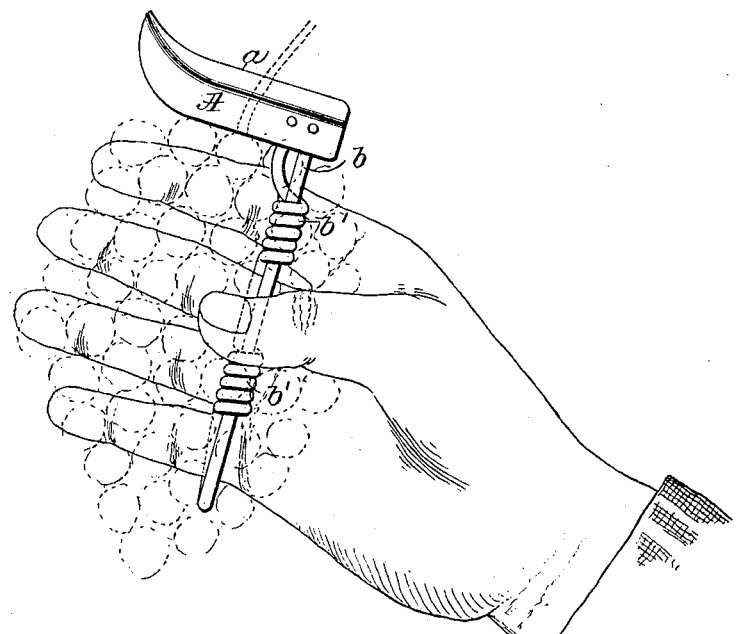
Figure 2:
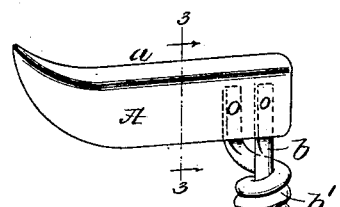
Figure 3:
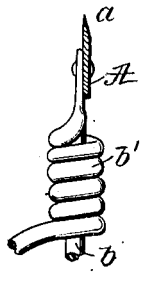

The details of construction and operation of the implement are as hereinafter described, and illustrated in the accompanying drawing, in which Figure 1 is a perspective view of the cutting implement in the position it is held by the operator while gathering grapes. Fig. 2 is a side view of same. Fig. 3 is a cross-section on the line 3—3 of Fig. 2.

An elongated blade A is attached at one end to a handle B, the two being arranged substantially at right angles to each other and the blade being practically in the same plane with the handle. The outer edge $a$ of the blade is sharpened and the opposite edge is blunt or broad. The handle B is in this instance formed of a piece of wire, both ends of which are attached to the side of the blade A adjacent to its heel, one portion $b$ extending downward from the blade and being nearly straight, while the other is curved and coiled around the part $b$ at $b'$, the portion $b^2$ which is intermediate the two coils being extended laterally to form a loop, or ring, and the lower portion being similarly extended laterally to form a second loop, or ring $b^3$. These loops, or rings, are adapted to receive, respectively, the second and fourth finger of the hand as will be understood by reference to Fig. 1 and the loops are arranged in the same plane with, and directly behind, the blade. Thus, in using the instrument, such fingers are inserted through the loops $b^2$ and $b^3$, and the body of the handle, composed of the part $b$ and the coils $b'$, lies in contact with the bases of the operator's fingers, and on the palm side of the hand. The operator seizes a bunch of grapes for instance, as illustrated in Fig. 1, the same being held between the fingers and thumb, and simultaneously presses the blade $a$ against the stem of the bunch, whereby it is easily and quickly severed. The operator may give the blade a draw cut at the same time that pressure is applied, in order to facilitate severing a stem of unusual size or toughness. It is thus apparent that the use of both hands is not required for gathering grapes, apples, peaches, or other fruit, or certain vegetables, such as tomatoes, for instance. The implement may be used on both the right and left hand simultaneously, so the operator may without difficulty gather fruit with both hands.

I claim—

1. The improved fruit-cutter comprising a blade, a handle attached to one end thereof and arranged substantially at right angles thereto and in the same plane therewith, the said handle having in the same plane with the blade two loops for reception of fingers of the operator's hand, and the cutting edge of the blade being on its outer side, as set forth.

2. The improved fruit-cutter comprising a blade, a handle secured to one end of same and formed of wire, one portion of which is twisted around the other and extended laterally, the extensions being constructed as loops adapted to receive the fingers of the operator's hand, as described.

HENRY ALL.

Witnesses:
L. L. ARCHER,
B. F. KNOTT.